United States Patent [19]

Servin

[11] Patent Number: 5,464,488
[45] Date of Patent: Nov. 7, 1995

[54] METHOD OF SEAMING PLASTIC FABRICS

[75] Inventor: Randall F. Servin, Hortonville, Wis.

[73] Assignee: Albany International Corp., Albany, N.Y.

[21] Appl. No.: 362,660

[22] Filed: Dec. 22, 1994

[51] Int. Cl.⁶ .................................................. B32B 31/16
[52] U.S. Cl. .......................... 156/73.4; 156/157; 156/217; 156/227
[58] Field of Search ........................... 156/64, 73.1, 73.4, 156/157, 159, 217, 227, 580.1, 580.2; 264/23

[56] References Cited

U.S. PATENT DOCUMENTS

| | | | |
|---|---|---|---|
| 3,184,354 | 5/1965 | Strother | 156/73.1 |
| 3,445,307 | 5/1969 | Balamuth et al. | 156/73.1 |
| 3,488,240 | 1/1970 | Roberts | 156/73.1 |
| 3,652,354 | 3/1972 | Su | 156/73.1 |
| 3,661,667 | 5/1972 | Gardner et al. | 156/73.1 |
| 3,733,243 | 5/1973 | Crawford | 161/48 |
| 4,018,955 | 4/1977 | Klaüke et al. | 428/57 |
| 4,090,897 | 5/1978 | Minick | 156/73.1 |
| 4,414,044 | 11/1983 | Wang et al. | 156/73.2 |
| 4,490,199 | 12/1984 | Dunning | 156/73.4 |
| 4,501,782 | 2/1985 | Weatherly et al. | 428/57 |
| 4,938,817 | 7/1990 | Langley | 156/73.1 |
| 4,980,213 | 12/1990 | Obeda | 428/57 |
| 5,085,719 | 2/1992 | Eck | 156/73.4 |
| 5,204,165 | 4/1993 | Schortmann | 428/198 |
| 5,230,761 | 7/1993 | Crawford | 156/73.3 |
| 5,356,682 | 10/1994 | Stewart et al. | 428/57 |

Primary Examiner—James Engel
Assistant Examiner—J. Sells
Attorney, Agent, or Firm—Kane, Dalsimer, Sullivan, Kurucz, Levy, Eisele and Richard

[57] ABSTRACT

A method for forming a strong and flexible bond between two plastic fabric layers requires the controlled use of an ultrasonic welding apparatus. Control of the time ultrasonic energy is delivered to the two overlapped plastic fabric layers, and of the pressure placed upon those layers during that time, is exercised to ensure that no melting of the yarns from which the two fabric layers are woven occurs. Rather, the yarns are softened by the application of ultrasonic energy, and are compressed together between the horn and an anvil to force them to adhere to one another. After the ultrasonic energy is turned off, compression is maintained while the overlapped plastic fabric layers cool and harden. A strong, flexible bond, suitable for operation as a seam for an endless belt, is obtained. Because the yarns do not melt during the application of the ultrasonic energy, the bond obtained by the practice of the invention is not brittle, and consequently is not susceptible to the cracking and breakage observed in the bonds produced by ultrasonic welding in the prior art.

18 Claims, 6 Drawing Sheets

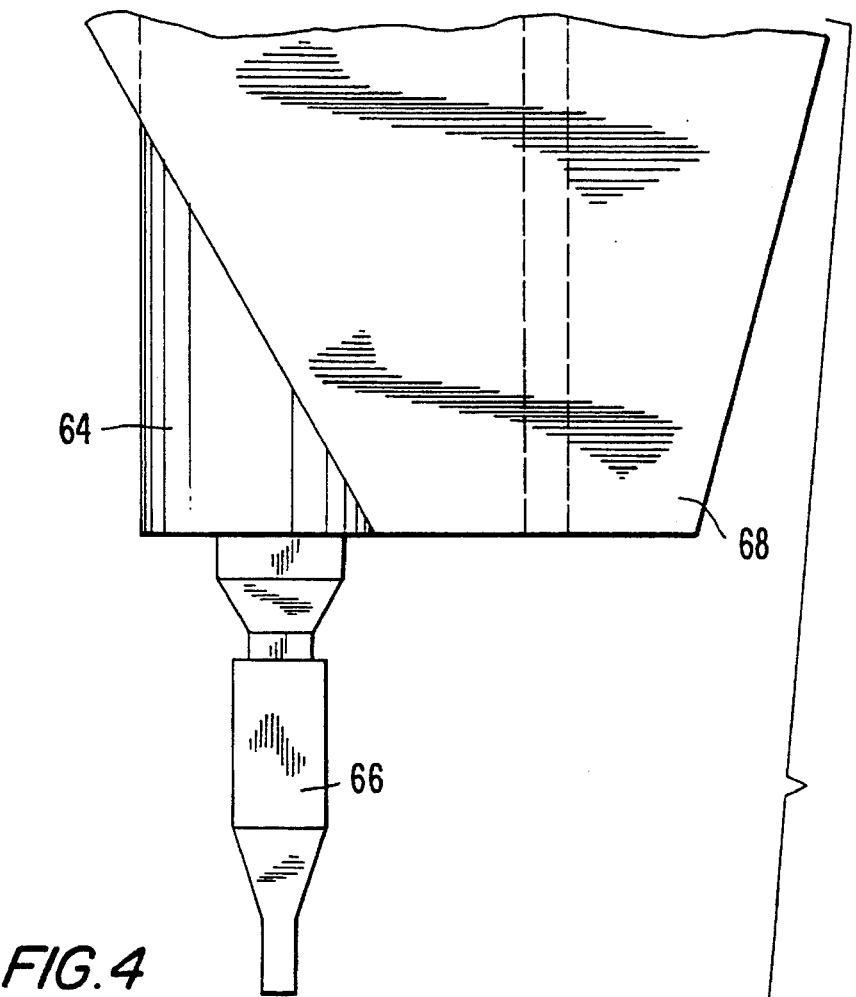
FIG.4
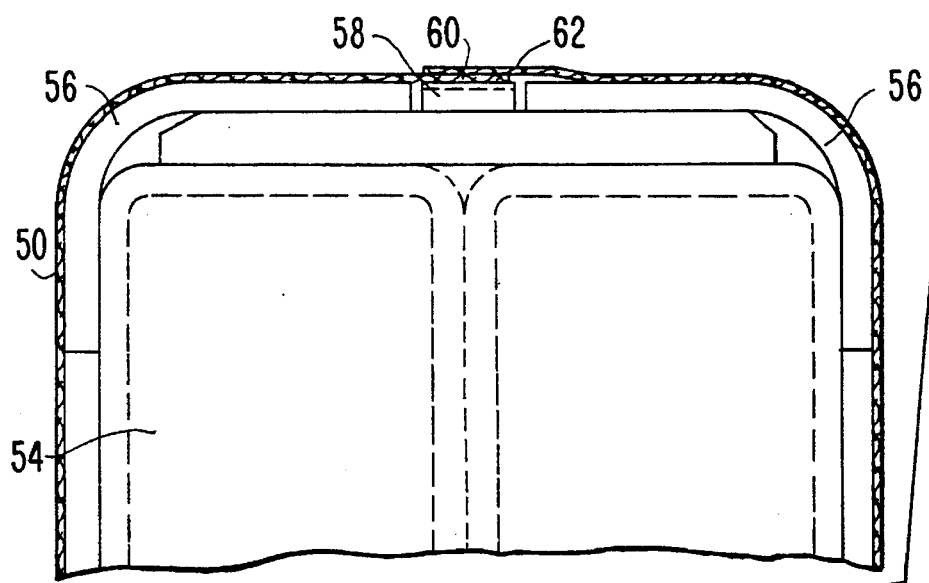

METHOD OF SEAMING PLASTIC FABRICS

BACKGROUND OF THE INVENTION

1. Field of the Invention

The present invention relates to the seaming of plastic fabrics into endless loops for use as industrial belts in the production of paper, board and similar products. More specifically, the invention concerns the use of ultrasonic energy to produce a seam by welding together the overlapped ends of a length of plastic fabric to form an endless belt.

2. Description of the Prior Art

Ultrasonic energy has long been used to weld or bond plastic elements to one another. The prior art in the textile and industrial fabric fields alone indicates that many attempts have been made to use ultrasonic energy to join plastic yarns and fabrics together. In the latter case, the uses have been both to join lengths of plastic fabric into endless forms to produce an endless belt or ribbon, and to patch holes in such fabrics by covering them with pieces of identical fabric and welding the pieces in place over the holes.

For example, U.S. Pat. No. 3,184,354 to Strother shows a method for splicing yarns, particularly multifilament yarns of a synthetic polymeric resin, by means of pressure and high frequency (ultrasonic) vibrations. The method results in a small splice of substantially circular cross section, usually smaller than the normal free diameter of the yarn. More importantly, the splices are such that the dye characteristics of the yarn portions joined in the splice are unchanged, so that the splices remain inconspicuous in the finished product. To accomplish this desirable effect, the yarns are compressed in a slot in a die by a tool, which applies ultrasonic energy to the compressed yarns, whereby the fibers or filaments thereof are softened, compacted and securely bonded to one another without producing at the splice point a solid mass that would not accept dye in the same manner as does the yarn.

U.S. Pat. No. 4,018,955 to Klaüke et al. shows a continuous printing ribbon constructed by overlapping the ends of a length of ribbon made of thermoplastic synthetic material and welding the overlapped ends together along a grid work of fine weld lines. This provides a weld joint comprising a punctiform arrangement of ink-bearing cells to effect an undisturbed emission of ink across the joint during a printing operation. The conditions of pressure and temperature under which the grid-like network of fine line welded joints are formed are produced ultrasonically, whereby the overlapped ribbon end portions are "hammered" at an ultrasonic rate, the result of which is to generate sufficient heat in the ribbon material to fuse the impacted portions thereof.

U.S. Pat. No. 4,090,897 to Minick shows a method and apparatus for patching or seaming thermoplastic mesh fabrics, such as those used in the papermaking industry, by means of an ultrasonic welding tool. The tool is provided with one or more tips having raised surface portions or projections adapted for contacting the plastic mesh at a plurality of spaced points whereby ultrasonic welding is accomplished without substantial disruption or diminution of the generally uniform porosity inherent to the mesh fabric. The method modifications involve the use of templates for guiding the positioning and movement of the ultrasonic welding tips for both butt seaming and overlap seaming of the opposed edges of a thermoplastic mesh fabric. In the butt seaming technique, the outermost weft filaments of the opposed edges of the plastic fabric are replaced by one heat-stabilized filament and the picket ends of the fabric are interdigitated about this stable filament preparatory to the welding step. In any case, when the ultrasonic tool is pressed downwardly against a thermoplastic material, such as a mesh fabric superimposed on another fabric made of the same thermoplastic material, the vibratory energy causes localized heating between the two fabric layers and the thermoplastic will consequently melt and flow to form a permanent welded bond of the two superimposed fabric layers in a fraction of a second. Lap seams are shown to be made by spot-welding the overlapped fabric edge.

U.S. Pat. No. 4,490,199 to Dunning shows an apparatus and method of splicing polymeric webs using an ultrasonic welder and a web support means. Means are provided for securing the trailing end of at least one first web and the leading end of at least one second web between the ultrasonic welder and the web support means. The trailing end of the first web and the leading end of the second web overlap between the ultrasonic welder and the web support means and are welded together. Preferably, the ultrasonic welder heats the polymeric material in the polymeric web to a temperature above the melt temperature and exerts a pressure on the webs causing them to fuse together.

U.S. Pat. No. 4,501,782 to Weatherly et al. shows a method for bonding thermoplastic webs. The method includes the steps of interdigitating the ends of the warps at opposing web edges, wherein the length of the interdigitation insures that the end of an interdigitated filament overlies the first shute of the opposing web. The interdigitated fibers are subsequently ultrasonically bonded in a continuous manner across the width of the web so that the ends are crushed down and flattened over the corresponding shute. The warp ends may overlie a number of opposing shutes as long as the overlap is no more than 1½ times the thickness of the web. The web bonding method for producing a continuous belt produces a web joint which is substantially coplanar with the remainder of the web such that the web is uniquely adapted to papermaking processes which avoids bumps or ripples in the sluice that solidifies on the web. In a further embodiment, ultrasonic energy is utilized to bond the web edges.

In general, the use of ultrasonics to seam plastic fabrics, either by overlapping or butting the opposite ends thereof, into endless form for use as belts in the paper production and related industries, has not met with any noteworthy success. The principal reason for past failures in this respect may be traced to the effect that ultrasonic welding has on the plastic material itself. When the yarns, such as monofilament yarns, from which industrial fabrics may be woven, are extruded from molten polymeric resin materials, they are subjected to a sequence of drawing and relaxation which extends the constituent molecules and aligns them with respect to one another. Among the properties given to the yarns during these steps in their production are linear strength and flexibility.

In the past, the seaming of plastic fabrics by ultrasonics has been by welds produced by the melting of the polymeric material of the yarns at the weld point, and by the fusing and subsequent solidification of the liquid polymeric material into a solid mass. Inevitably, this fusing and subsequent solidification of the polymeric material at the weld changes its structural properties relative to those of the yarns. Most importantly, the crystallization which occurs on solidification makes the weld more brittle than the yarns themselves. As a consequence, when placed under longitudinal tension and when flexed about rolls, possibly of small diameter under such tension, the seam has the tendency to break at the relatively inflexible weld.

With the present invention, the Applicant has provided an improved method for forming an overlapped seam in plastic fabrics using ultrasonics. The seam produced is stronger and flexible, does not have the brittleness and consequent early failure rate of prior-art seams joined by ultrasonics, and may be formed in one hour, as compared to the 80 hours typically required to form a woven seam in fabrics of this type.

SUMMARY OF THE INVENTION

Accordingly, the present invention is a method for bonding a plastic fabric layer to another plastic fabric layer by ultrasonic energy. Each fabric layer is woven from yarns of a synthetic polymeric resin. The two plastic fabric layers may be the lengthwise ends of a length of flat-woven fabric, in which case the lengthwise ends may be overlapped with one another and bonded through the practice of the present invention to seam the flat-woven fabric into an endless belt.

The two plastic fabric layers may also be formed by a fold-back at the end of a length of flat-woven fabric. The fold-back may be used to secure seaming coils within the crease formed thereby. The fold-back may be bonded to the fabric through the practice of the present invention.

Further, a flap, formed by cutting a short length from the end of a plastic fabric, may be bonded to a fabric adjacent to a fold-back of the type described in the preceding paragraph to cover the spiral seam provided thereby. In this instance, the flap may be bonded widthwise across the fabric adjacent to the fold-back through the practice of the present invention.

It follows that a hole or tear in a plastic fabric layer may be repaired by placing a piece of preferably identical plastic fabric thereover, and by bonding the piece to the underlying plastic fabric layer through the practice of the present invention.

The present invention may be distinguished from the prior art by the control exercised over the length of time during which ultrasonic energy is applied to the fabric layers being bonded to one another, and over the pressure placed thereupon by the horn supplying the ultrasonic vibrations. Care is taken not to crush the yarns of the fabric layers between the horn and its associated anvil, particularly the warp yarns, which, in flat-woven fabrics, are in the machine direction of the fabrics being seamed into endless belts. For this reason, in all embodiments of the present invention, the horn's motion toward the anvil is halted shortly after it reaches a preselected distance therefrom, at which preselected distance the ultrasonic vibrations are turned off.

More importantly, the time and pressure of the bonding is controlled so that no melting of the polymeric resin material of the yarns occurs. As a consequence, the bonding is accomplished by softening, not fusing, the material of the yarns, and by pressing the softened yarns together, adhering them to one another. Because no melting occurs, the polymer structure of the yarn material is not altered, as it would be by melting. The brittleness, which accompanies the melting, or fusing, and resolidification of the plastic material under prior-art methods, and which is the result of the recrystallization of the previously molten material, is thereby avoided. A strong and flexible bond, not susceptible to the cracking and failure that would be caused by brittleness, is the result. The interval during which ultrasonic energy is delivered to the two overlying plastic fabric layers is about 0.2 to 1.5 seconds in length.

The present method comprises the steps of providing an ultrasonic welding apparatus having a horn for delivering ultrasonic energy to the two overlapped plastic fabric layers, and of providing an anvil toward and against which the horn may be moved to clamp the two plastic fabric layers together for bonding.

In the practice of the method, the two plastic fabric layers are placed, one atop the other, on the anvil, and the horn is moved toward the two overlapped plastic fabric layers on the anvil at a preselected rate of speed.

The horn is activated to deliver ultrasonic energy to the two overlapped plastic fabric layers when the force with which the horn clamps them against the anvil reaches a preselected level. The force is increased over this preselected trigger force while the horn delivers ultrasonic energy to the two overlapped plastic layers, softening the yarns from which they are woven and compressing the softened yarns together without melting the yarns.

The horn is deactivated to stop the delivery of ultrasonic energy therefrom, when it reaches a preselected distance from the anvil. The force applied by the horn against the two overlapped plastic fabric layers is then maintained for a preselected hold time to allow the softened polymeric resin material of the yarns to cool and to harden under compression. Finally, the horn is removed from the two overlapped plastic fabric layers and anvil.

In practice, the two plastic fabric layers are bonded to one another by repeating the steps described above a plurality of times, since the plastic fabric layers being bonded to one another are typically much wider than the length of the horn. Accordingly, to perform a seaming operation, for example, the two overlapped fabric ends must be bonded together in increments equal in length to that of the horn, with overlap between adjacent increments being kept to a minimum. This will require the horn to be translated, relative to the overlapped fabric ends, a distance equal to the length of the horn after each horn-length section of the seam being formed has been bonded. The process must be repeated as many times as is necessary to move the horn, in steps equal to its length, across the width of the fabric.

The present invention may be applied in the seaming of plastic fabrics into endless loops for use as industrial belts in the production of paper, board and similar products. For example, belts used on the Black Clawson double nip thickener for deinking and recycling paper may be seamed in accordance with the present invention. Further, shrinkable spiral seamed belts for use on vacuum drums, such as those belts described in Example 2 below, may include fold-backs and flaps secured in accordance with the present invention. Finally, belts for any twin wire press for processing pulp and/or sludge, or any other material that must have its solids content raised, may be seamed through the practice of the present invention.

The present invention will now be described in more complete detail with frequent reference being made to the drawings to be identified hereinbelow. Several examples are also provided to illustrate the present invention to those of ordinary skill in the art.

BRIEF DESCRIPTION OF THE DRAWINGS

FIG. 4 is an enlarged view of the circled portion of FIG. 3;

DETAILED DESCRIPTION OF THE PREFERRED EMBODIMENTS

Figure 1:
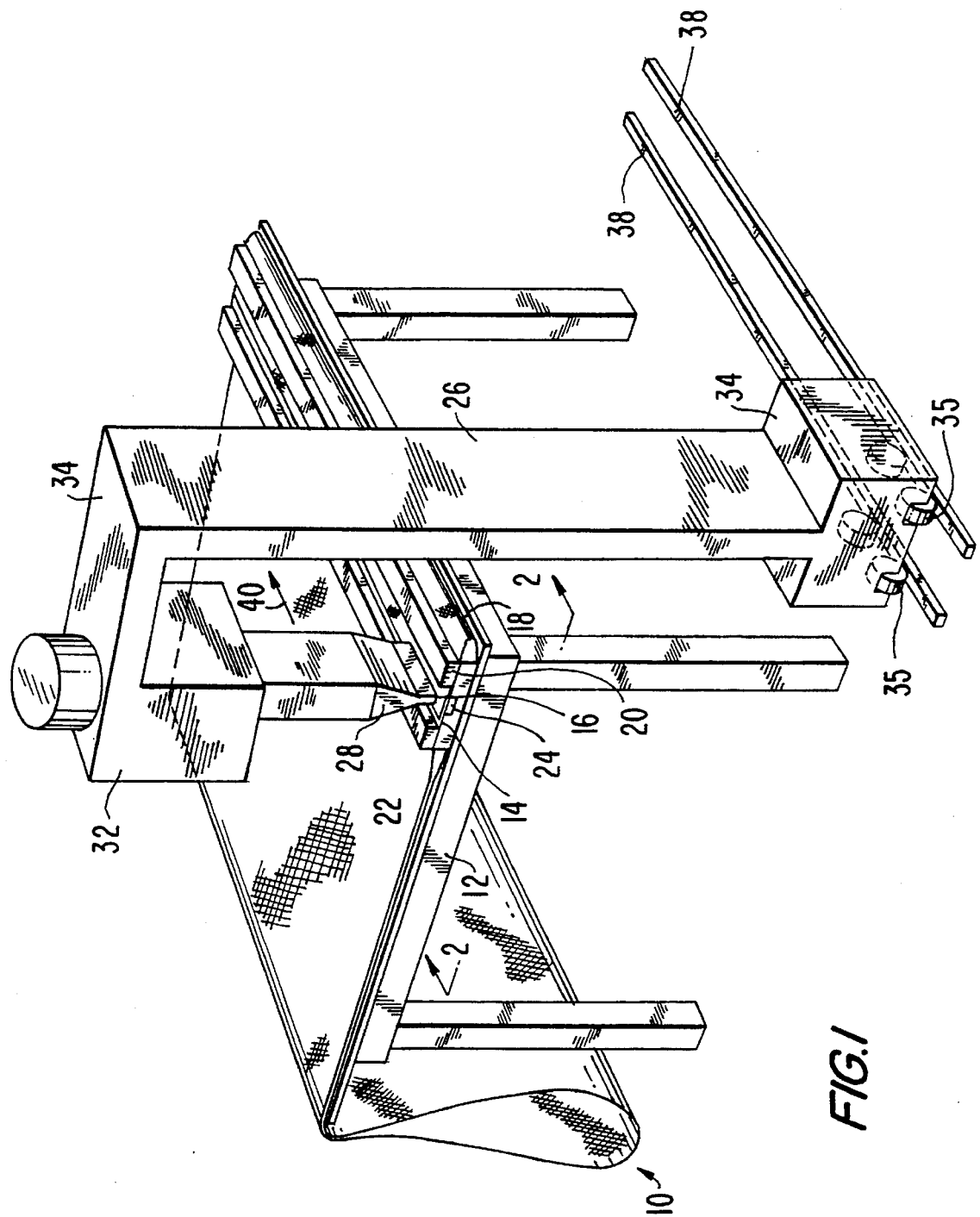
FIG. 1 is a diagrammatic illustration of the overlapped widthwise ends of a flat-woven fabric being bonded to one another to form a seam through the utilization of a movable ultrasonic horn which traverses the width thereof.

Referring now to FIG. 1, a flat-woven fabric 10 has a portion which extends over a table or stand 12 with one end 14 overlapping a second end 16 which has been reverse folded at 18 and is clamped in place by a horizontally extending bar 20. The opposing end 14 of the flat-woven fabric 10 is clamped to overlap end 16 upon anvil 24 by horizontally extending bar 22.

An ultrasonic welding apparatus 32 includes a horn 28. The ultrasonic welding apparatus 32 is supported by a transverse brace 34 extending from an upright brace 36 mounted to a counterweight 26, which is provided with wheels 35 and a track comprising a pair of rails 38 which permits movement of horn 28 in the direction of the arrow 40.

In the Examples set forth below, the Applicant used a Branson 900 AE/AO Series Actuator, obtained from Branson Ultrasonics of Arlington Heights, Ill., as the ultrasonic welding apparatus 32. The apparatus 32 was operated in Time Mode.

The apparatus 32 may be used to weld thermoplastic parts ultrasonically by applying high frequency vibrations to the parts being joined. The vibrations, through surface and intermolecular friction, produce a sharp rise in temperature at the joint where the parts meet.

When the temperature is high enough to melt the plastic, there is a "flow" of material between the parts. When the vibrations stop, the material solidifies under pressure and a uniform weld results.

In the practice of the present invention, as has been noted above, the operating conditions of the ultrasonic welding apparatus 38 are controlled so that no melting occurs. Instead, the yarns in the fabric layers to be bonded, such as the yarns in flat-woven fabric 10, are merely softened by the intermolecular friction produced by the ultrasonic vibration, and are forced together under pressure. The plastic is deliberately not melted, so that its molecular structure will not be rearranged into one more crystalline and possibly more brittle.

Most plastic welders operate at a frequency above the range of human hearing (18 kHz) and are thus called ultrasonic. In the practice of the present invention, and specifically in providing the Examples appearing below, the Applicant used ultrasonic vibrations having a frequency of 20 kHz.

With the ultrasonic system used, several operating parameters may be varied to obtain optimum bonding results. Firstly, a pneumatically activated carriage mechanism moves the horn into contact with the fabric layers to be bonded to one another. The pressure in the air cylinder which drives the horn into such contact, as well as the speed, referred to hereinbelow as the downspeed, at which the horn advances toward the overlapped fabrics, may be preselected by the operator.

Most welding applications require that pressure be built up on the parts to be welded before ultrasonic energy is applied. In the present invention, this so-called ultrasonic energy trigger force is preselected. When the horn comes into contact with the overlapped fabric layers, it begins to compress them together against an underlying anvil. When the total force exerted by the horn reaches the preselected level referred to as the ultrasonic energy trigger force, the ultrasonic vibrations are initiated.

The horn 28 has a flat welding surface, having a length of 7.0 inches and a width of 0.5 inch. The edges along its lengthwise sides may be chamfered, as they were for the horn 28 used by the Applicant, to reduce the width of its flat surface to ⅜ inch (0.375 inch). The horn 28 itself is made of carbide-coated titanium, and is Branson part number 430-018-124. The horn 28 was used in conjunction with a Gold Booster.

Figure 2:
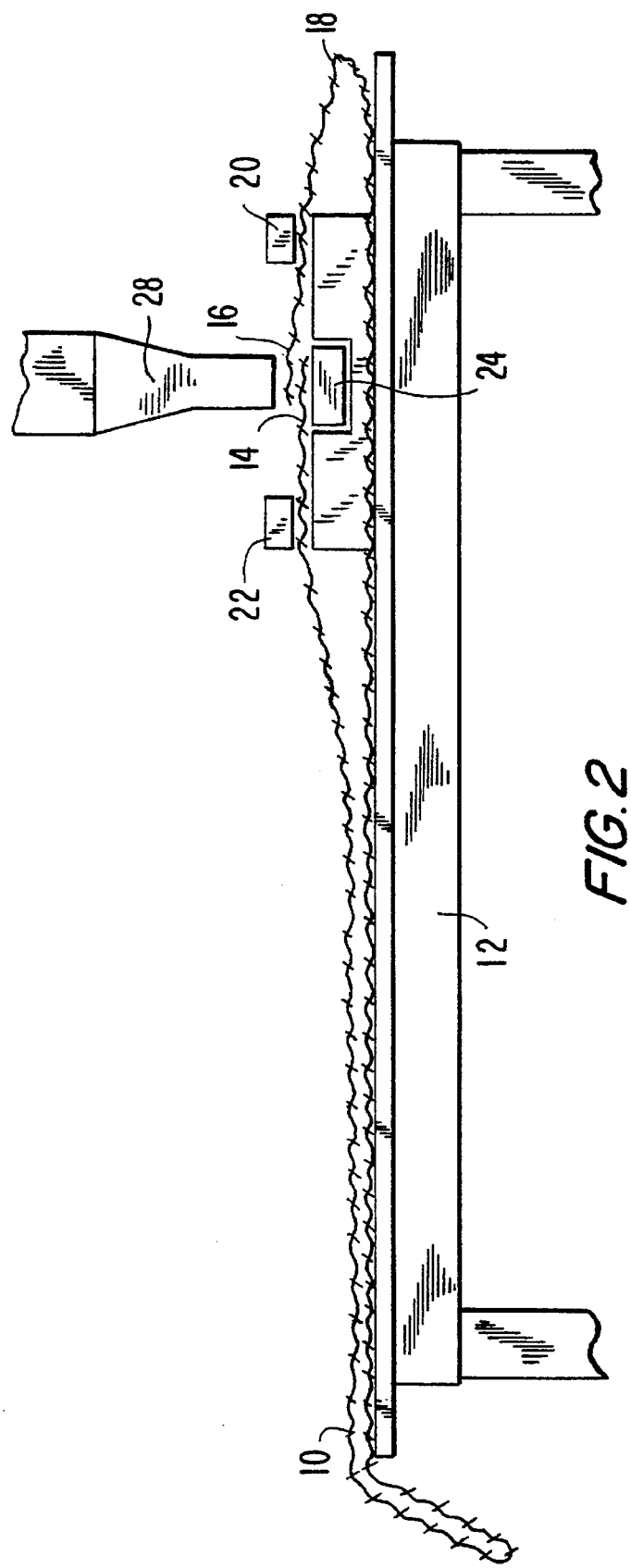
FIG. 2 is an end view of the system shown in FIG. 1 taken as indicated by line 2—2 in that figure.

FIG. 2 is an end view of the apparatus shown in FIG. 1 and taken as indicated by line 2—2 in FIG. 1. It is presented to show the overlapping of the ends 14, 16 of flat-woven fabric 10 on the anvil 24.

The anvil 24 may have a substantially planar surface against which the horn 28 compresses the fabric ends 14, 16 to be bonded together. It is typically made from tool steel.

Figure 3:
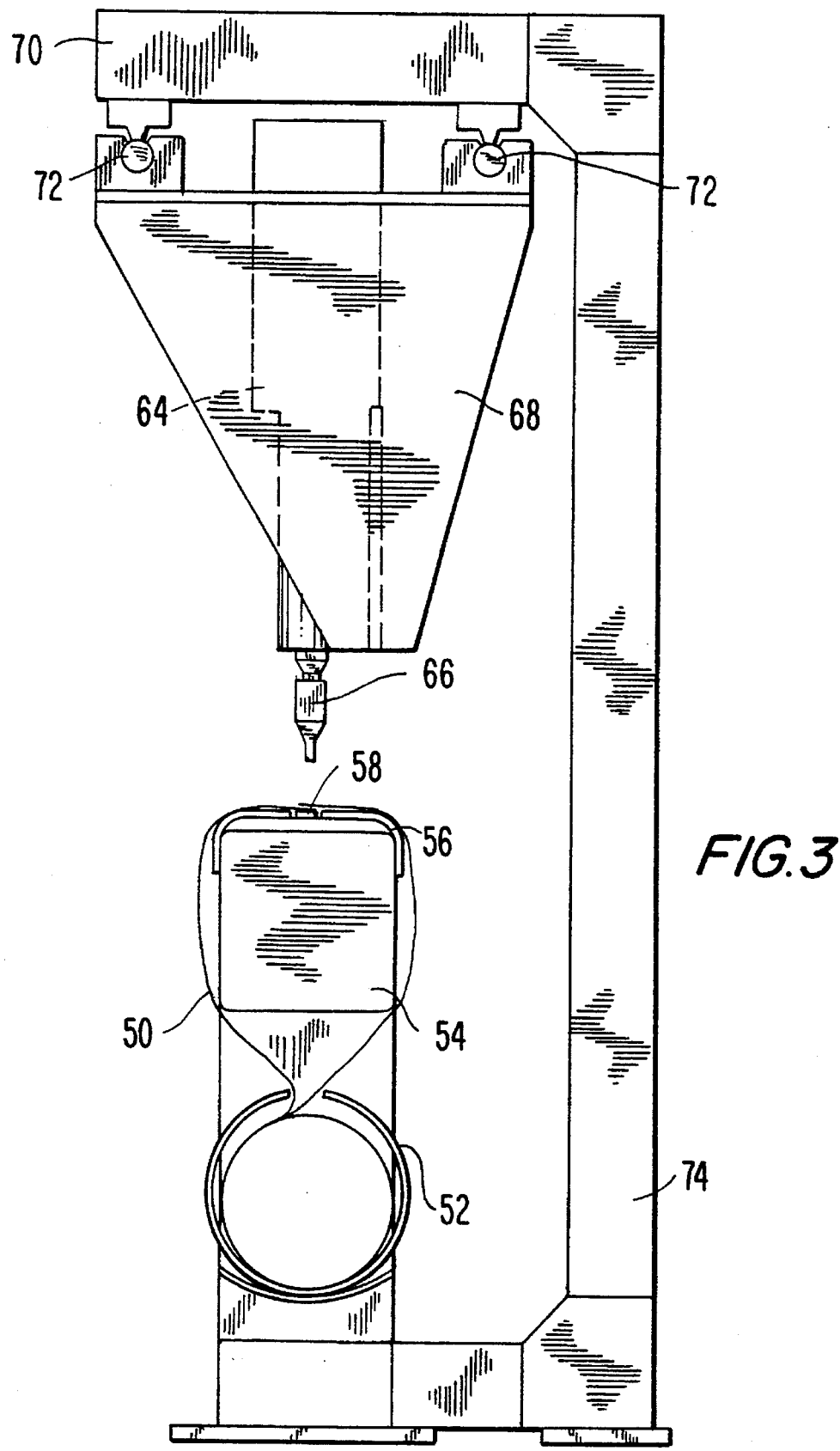
FIG. 3 is an end view of another system which may be used in the practice of the present invention.

FIG. 3 is an end view of another system whch may be used in the practice of the present invention, and FIG. 4 is an enlarged view of the circled portion of FIG. 3. A flat-woven fabric 50 is rolled up and disposed within a protective housing 52 beneath a horizontal support 54 having a work surface 56. An anvil 58 is included in the work surface 56, and is more-or-less coplanar therewith. A first end 60 of the fabric 50 is disposed on the anvil 58, and a second end 62 of the fabric 50 is disposed on the first end 60. Means, such as the horizontally extending bars 20,22 shown in FIGS. 1 and 2, may also be included to keep the first and second ends 60,62 in the illustrated positions.

An ultrasonic welding apparatus 64 includes a horn 66. The ultrasonic welding apparatus 64 is mounted on a vertical support 68, which, in turn, is laterally translatable along horizontal support 70 on rollers 72. Horizontal support 70 may extend from vertical support 74.

Figure 5B:
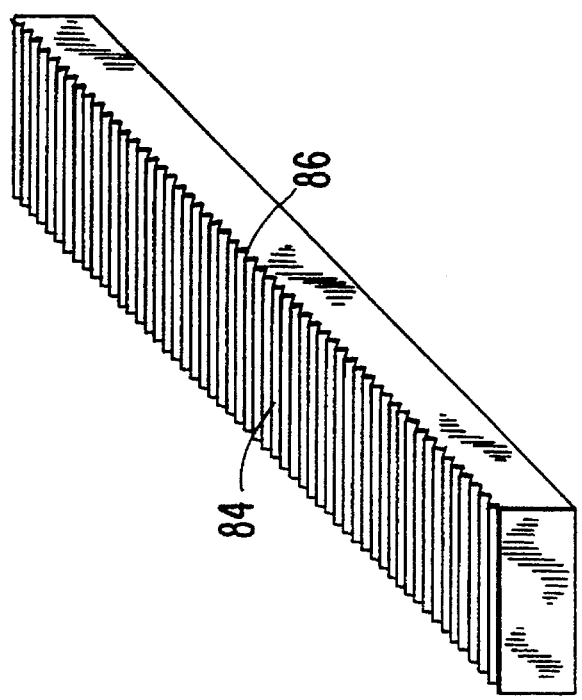
FIGS. 5A and 5B are perspective views of anvils used in the practice of the present invention.
Figure 5A:
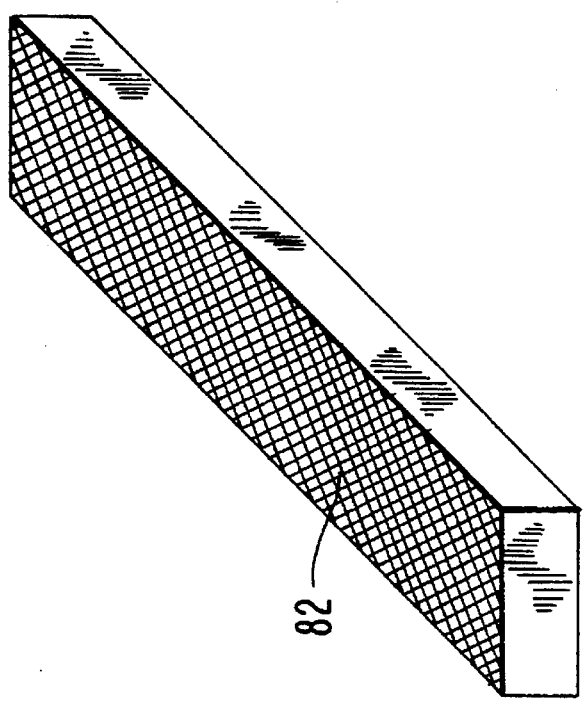

FIGS. 5A and 5B are perspective views of the surfaces of two anvils which may be used during the practice of the present invention. FIG. 5A shows an anvil 82 having a knurled surface. The knurling may be either fine or coarse. FIG. 5B shows an anvil 84 having a plurality of transverse ribs 86. Each of these anvils 82,84 permits a stronger bond, such as that holding a seam together, to be formed than would be obtained using a smooth anvil.

A knurled anvil provides better results than a smooth anvil, and a ribbed anvil provides results that are better still than those obtained with a knurled anvil. When the change from a knurled anvil to a ribbed anvil was made, the seam strength obtained jumped from 140 pli to 210 pli. These results, that is, the improvements realized in using a knurled or ribbed anvil instead of a smooth one, are achieved because the knurled or ribbed anvil makes it less likely that the yarns, particularly the warp (or machine-direction) strands, will be crushed between the horn 28 and the anvil.

In like manner, the welding surface of horn 28 may be knurled or ribbed.

In the Examples to be set forth below, an anvil having 20 transverse ribs per inch, each rib coming to a point having a 45° angle, was used.

When the horn 28 is brought down onto the overlapped fabric ends on the anvil 24, and the ultrasonic energy trigger force is reached, ultrasonic vibrations, heating and softening the yarns in the underlying area between the horn 28 and anvil 24, will be initiated. Depending on the style of the fabric, the vibrations will continue for approximately 0.2 to 1.5 seconds while the softening, but not melting, yarns are compressed together. During the time the vibrations occur, the horn continues to compress the overlapped fabric ends against the anvil. When the horn 28 reaches a preselected distance from the anvil 24, the ultrasonic vibrations are stopped. In those cases where a knurled anvil 82 or a ribbed anvil 84 is used, the preselected distance is measured between the surface of the horn 28 and the plane defined by the topmost points of the knurls or ribs on anvils 82,84.

Following the cut-off of ultrasonic vibrations, the horn 28 applies a force against the fabric layers on the anvil 24 for a preselected hold time, during which the softened yarns which have been pressed together cool and harden to provide a strong and flexible bond between the two fabric layers.

In the practice of the present invention, the time and pressure of the bonding is controlled so that no melting of the polymeric resin material of the yarns occurs. For a given fabric, the operating conditions of the ultrasonic welding apparatus 38 must be determined and preselected so that the yarn material will not melt during the bonding process. The parameters which must be preselected are: a) the cylinder air pressure; b) the downspeed; c) the shut-off position (distance of horn to anvil where ultrasonic vibrations are shut off); d) the trigger force; and e) the hold time.

In the paragraphs to follow, by a dense weave pattern is meant a weave pattern have a low, such as 0% open area.

By a fine monofilament fabric is meant one woven from strands having diameters from 0.006 inch (6 mil) up to and including 0.015 inch (15 mil), and having a caliper from 0.012 inch (12 mil) to 0.0279 inch (27.9 mil).

By a medium monofilament fabric is meant one woven from strands having diameters in excess of 0.015 inch (15 mil) up to 0.0319 inch (31.9 mil), and having a caliper from 0.028 inch (28 mil) up to 0.0649 inch (64.9 mil).

By a coarse monofilament fabric is meant one woven from strands having diameters of 0.032 inch (32 mil) and up, and having a caliper from 0.065 inch (65 mil) and up.

The cylinder air pressure (gauge pressure) may be preselected as follows:

a) 50 to 60 psi for nylon (polyamide) and polyvinylidene fluoride (PVDF) monofilament fabrics;

b) 70 to 80 psi for fine and medium polyester monofilament fabrics having 1, 2 or 3 layers; and c) 80 to 100 psi for coarse monofilament fabrics and dense weave patterns.

The downspeed is initially set at 3.0 inches per second. It may be decreased below this value where the horn causes the overlapped fabric layers to slide out of alignment on the anvil. In such a situation, the downspeed may be decreased below 3.0 inches per second until sliding does not occur. The downspeed may be increased above 3.0 inches per second to speed up the bonding procedure, so long as the increase does not cause the sliding noted above.

The shut-off position is initially selected to be equal to the caliper (thickness) of the fabric. A test bond is conducted at that shut-off position, and the bonded section inspected. Where poor bonding has occurred, such that the bond is easily broken in a tensile test, the shut-off position may be decreased. On the other hand, where burning and melting have occurred, or where the fabric breaks along the edge of the bonded seam with little force because of brittleness, the shut-off position may be increased. The increase, or decrease, in the shut-off position may be made in increments of 0.001 inch to 0.002 inch.

The trigger force is the signalling force for ultrasonics to begin. It may be preselected as follows:

a) for nylon (polyamide) and polyvinylidene fluoride (PVDF) fabrics, 50 to 150 lbs. More specifically, where the fabric is woven in a 2-shed pattern, the trigger force may be 50 to 80 lbs.; for a 3-shed pattern, 80 to 125 lbs; and for a 4-shed pattern, 125 to 150 lbs.;

b) for fine and medium polyester monofilament fabrics having 1, 2 or 3 layers, 150 to 250 lbs. More specifically, where the fabric is woven in a 2-shed pattern, or where it is a one-layer fabric, the trigger force may be 150 to 175 lbs.; for a 3-shed pattern, or for a two-layer fabric, 175 to 200 lbs.; and for a 4-shed pattern, or for a three-layer fabric, 200 to 250 lbs.; and c) for coarse monofilament fabrics and for fabrics having dense weave patterns, 250 to 400 lbs. More specifically, where the fabric is woven in a 2-shed pattern, the trigger force may be 250 to 300 lbs.; for a 3-shed pattern, 300 to 350 lbs.; and for a 4-shed pattern, 350 to 400 lbs.

Where burn holes occur across the bonded area, an increase in the trigger force will usually reduce the problem. In each instance, an increase in the shed of the weave pattern makes the bonding area more slippery, and the slipperiness is the reason behind the need of a higher trigger force.

Finally, the hold time is the length of time force is applied to the fabric after ultrasonic vibrations have stopped. This allows the bonded portion to cool and to reharden under compression. The hold time may be preselected as follows:

a) for nylon (polyamide) and polyvinylidene fluoride (PVDF) monofilament fabrics, 1.0 to 1.5 seconds;

b) for fine and medium polyester monofilament fabrics having 1, 2 or 3 layers, 0.2 to 0.7 seconds; and c) for coarse monofilament fabrics and for fabrics having dense weave patterns, 1.0 to 1.5 seconds.

In general, the hold time is not a critical setting in any bonding cycle, and is used to ensure that complete bonding occurs after ultrasonic vibrations have stopped.

In each case, all bonded areas (seams) should always be visually inspected, and a tensile test carried out, to ensure that the quality of the bond is adequate. A seam strength greater than 200 pli is the desired result.

The present invention will now be illustrated by the following Examples, which should not, however, be construed as limiting the scope of the present invention as claimed in the claims to follow.

EXAMPLE 1

The lengthwise ends of a flat-woven length of TRIOTEX® 114T from Albany International Corp., may be bonded together to seam the length of fabric into an endless loop. TRIOTEX® is a double-layer fabric comprising two woven plies joined by a weft binder. TRIOTEX® 114T is a fine woven fabric having 106 warp strands per inch and 133 weft strands per inch. The top ply comprises warp strands of 7 mil diameter, and weft strands of 7 mil diameter in a fine weave having a 22% open area. The bottom ply comprises warp strands of 11 mil diameter, and weft strands of 12 mil diameter in a coarse weave having a 31% open area. The weft binder is of 6 mil diameter. The fabric has a caliper of 0.037 inches, and is woven entirely from polyester yarns.

Before the ends of the fabric were bonded to one another, the two weft strands closest to each end on the coarse side were removed. Each end was placed fine-side down onto the anvil, so that the horn directly contacted the coarse side of one of the two overlapped ends.

The downspeed of the horn was 3.5 inches/sec; the air pressure to the cylinder was 96 lbs/in$^2$; and the ultrasonic energy trigger force was 250 lbs. The ultrasonic energy was shut off when the horn reached a point 0.036 inches from the plane defined by the tops of the transverse ribs on the anvil. The hold time was 0.500 seconds after ultrasonic energy was shut off.

The strength of the seam was found to be in the range from 225 to 245 pli, which is as strong as the current woven seam in use up to the present time.

EXAMPLE 2

The present invention was applied in the manufacture of fold-back seams in shrinkable fabrics woven from yarns of polyvinylidene fluoride, a polymeric resin which is commonly referred to as PVDF.

Three shrinkable fabrics produced by Albany International Corp. were used: Types 815-5L, 820-5L and 825-5L. In each of these product designations, 5L stands for 5 loops per inch, that is, 5 seaming loops protrude through the fold-back crease per inch of the fabric for seaming.

There are slight differences among the three products, which are designed to be installed about such machine components as vacuum drums, and to be heat-shrunk thereon to achieve a tight fit. These differences may be summarized as follows:

|  | 815 | 820 | 825 |
| --- | --- | --- | --- |
| Warps/Inch | 20 | 20 | 20 |
| Wefts/Inch | 14 | 18 | 18 |
| Warp Diameter (mil) | 15 × 23 (flat) | 23 | 15 × 23 (flat) |
| Weft Diameter (mil) | 28,35 (alternating) | 28 | 28 |
| Open Area (%) | 29.8 | 27.0 | 27.0 |
| Caliper (inches) | 0.065 | 0.052 | 0.045 |

All yarns in these three fabric models are made of PVDF.

The fold-back, which secures the seaming loops therewithin, may be bonded to the fabric in accordance with the following protocols:

|  | 815 | 820 | 825 |
| --- | --- | --- | --- |
| Downspeed (inches/sec) | 4 | 4 | 4 |
| Cylinder Air Pressure (lbs/in$^2$) | 50 | 50 | 50 |
| Trigger Force (lbs) | 80 | 80 | 80 |
| Shut-Off Position (inches) | 0.058 | 0.0635 | 0.0645 |

-continued

|  | 815 | 820 | 825 |
| --- | --- | --- | --- |
| Hold Time (Sec) | 1.25 | 1.25 | 1.25 |

After the fold-back has been bonded to the fabric, preferably as close to the loops as possible, such as, three or four weft yarns from the loops, excess material at the edge of the bond may be cut off with a seam ripper.

A flap, made from the same style of fabric in each case and nominally eight inches wide, may be used to cover the underside of the seam. In the 815 style, the flap should be cut next to the bigger of the two alternating weft yarns, which may be pulled out and discarded. The edge from which that weft yarn was removed may be bonded to the fabric. With the 820 and 825 styles, a weft yarn does not have to be removed in this manner. The other edges of the flap may be heat sealed. In sealing the flap to the fabric, the protocols set forth above were used.

Figure 6:
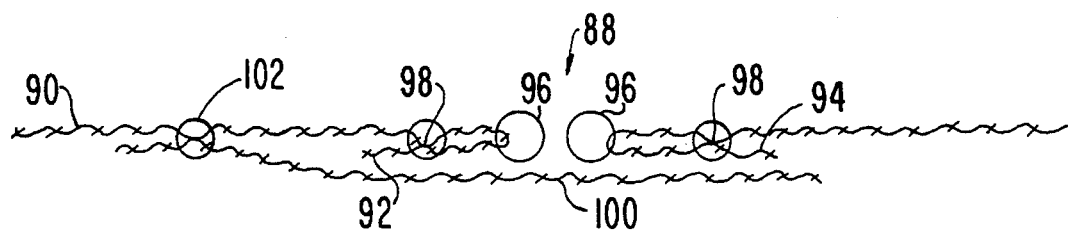
FIG. 6 is a cross-sectional view of a fold-back seam with a flap made in accordance with Example 2 below.

A cross-sectional view of a seam 88 of this type is shown in FIG. 6. Flat-woven fabric 90 has a first fold-back 92 at one end, and a second fold-back 94 at the other end. Spiral seaming coils, held within the first and second fold-backs 92,94, form seaming loops 96, are interdigitated with one another to define a passage through which a seaming pin or pintle may be passed to close the seam. The first and second fold-backs 92,94 are bonded to their respective fabric ends at points 98 through the practice of the present invention.

A fabric flap 100 may be used to cover and to protect the underside of the seam 88, that is, the side to which the first and second fold-backs 92,94 are bonded. The fabric flap 100 is bonded to one of the two fabric ends, adjacent to one of the two fold-backs 92,94, at point 102.

Figure 7:
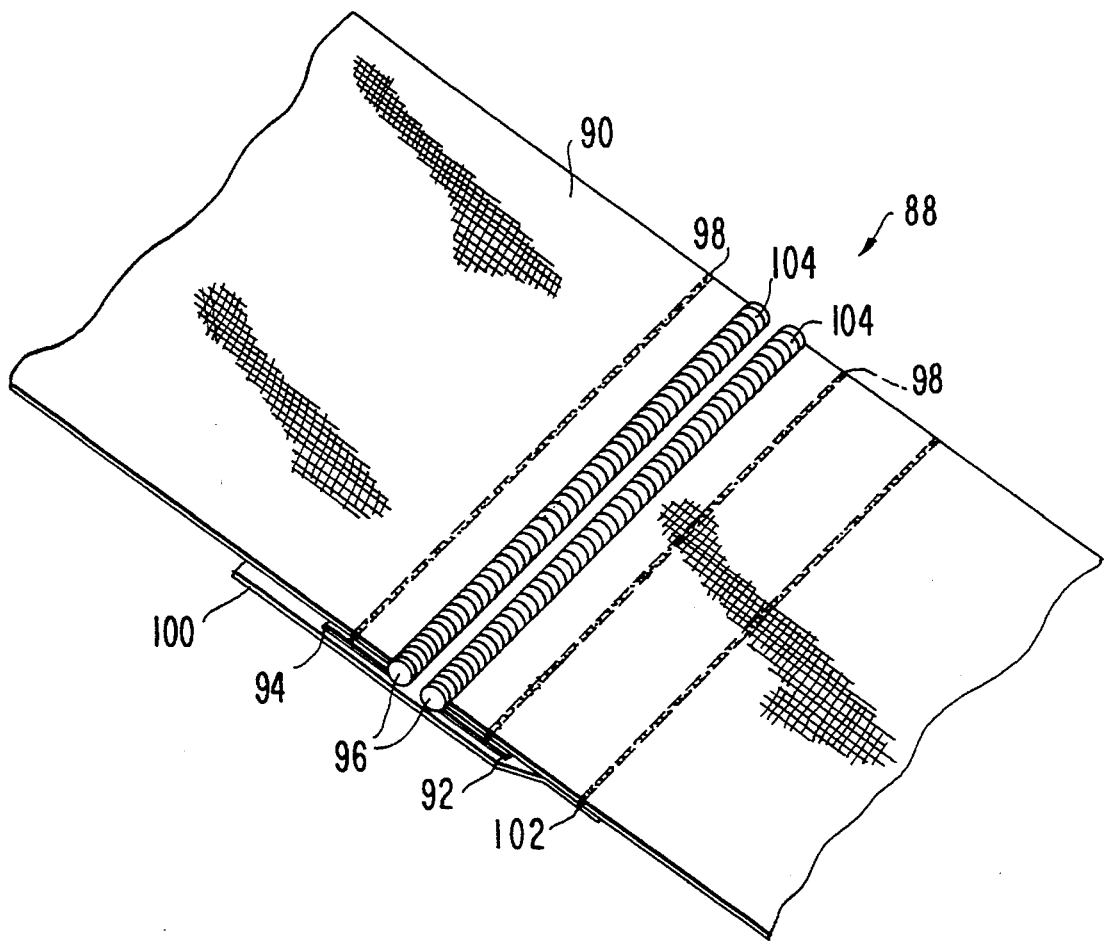
FIG. 7 is a perspective view of the topside of the fold-back seam shown in FIG. 6.

FIG. 7 is a perspective view of the topside of the fold-back seam 88. Spiral seaming coils 104, held within the first and second fold-backs 92,94, form seaming loops 96, which are not illustrated as being joined to one another by a seaming pin or pintle. Fold-backs 92,94 are bonded to their respective fabric ends at points 98, which define lines extending across the fabric 90 parallel to spiral seaming coils 104. In like manner, flap 100 is bonded to one of the two fabric ends, adjacent to fold-back 92 at points 102, which define a line extending across the fabric 90 parallel to spiral seaming coil 104.

EXAMPLE 3

The lengthwise ends of a flat-woven length of a single-layer four-shed fabric, style S84B from Albany International Corp., were bonded together to seam the length of fabric into an endless loop.

S84B has 84 warp strands per inch and 18 weft strands per inch. The warp strands are of 16 mil diameter, and the weft strands are of 20 mil diameter. The open area of the fabric is 0.0%; its caliper is 0.048 inches. The fabric is woven entirely from polyester.

The downspeed of the horn was 2.0 inches/sec; the air pressure in the cylinder was 92 lbs/in$^2$; and the trigger force was 280 lbs. The ultrasonic energy was shut off when the horn reached a point of 0.0488 inches from the plane defined by the tops of the transverse ribs on the anvil. The hold time was 0.200 seconds after ultrasonic energy was shut off.

EXAMPLE 4

The lengthwise ends of a flat-woven length of a single-layer four-shed fabric, style 20F from Albany International Corp., were bonded together to seam the length of fabric into an endless loop.

20F has 22 warp strands per inch and 16 weft strands per inch. The warp strands are of 25 mil diameter, and the weft strands are of 35 mil diameter. The open area of the fabric is 19.6%; its caliper is 0.060 inches. The fabric is woven entirely from polyester.

Before the ends of the fabric were bonded to one another, the weft strand closest to one end of the fabric, and five weft strands closest to the other end of the fabric, were removed.

The downspeed of the horn was 2.0 inches/sec; the air pressure to the cylinder was 92 lbs/in$^2$; and the trigger force was 280 lbs. The ultrasonic energy was shut off when the horn reached a point 0.0433 inches from the plane defined by the tops of the transverse ribs on the anvil. The hold time was 0.700 seconds after ultrasonic energy was shut off.

EXAMPLE 5

The lengthwise ends of a flat-woven length of a single-layer three-shed fabric, style 24A from Albany International Corp., were bonded together to seam the length of fabric into an endless loop.

24A has 22 warp strands per inch and 16 weft strands per inch. The warp strands are of 25 mil diameter, and the weft strands are of 35 mil diameter. The open area of the fabric is 19.6%; its caliper is 0.057 inches. The fabric is woven entirely from polyester.

Before the ends of the fabric were bonded to one another, two weft strands closest to one end of the fabric, and three weft strands closest to the other end of the fabric, were removed.

The downspeed of the horn was 2.0 inches/sec; the air pressure to the cylinder was 92 lbs/in$^2$; and the trigger force was 280 lbs. The ultrasonic energy was shut off when the horn reached a point of 0.0433 inches from the plane defined by the tops of the transverse ribs on the anvil. The hold time was 0.700 seconds after ultrasonic energy was shut off.

Modifications to the above would be obvious to those of ordinary skill in the art, but would not bring the invention so modified beyond the scope of the appended claims.

What is claimed is:

1. A method for bonding a first plastic fabric layer to a second plastic fabric layer, said first and second plastic fabric layers being woven from yarns of a synthetic polymeric resin and being overlapped with one another for bonding, said method comprising the steps of:

providing an ultrasonic welding apparatus having a horn for delivering ultrasonic energy to said overlapped first and second plastic fabric layers at a location where said first and second plastic fabric layers are to be bonded to one another;

providing an anvil toward and against which said horn is moved to clamp said first and second plastic fabric layers together for bonding;

disposing said first plastic fabric layer on said anvil;

disposing said second plastic fabric layer over said first plastic fabric layer on said anvil;

moving said horn toward and onto said overlapped first and second plastic fabric layers on said anvil at a preselected rate of speed;

activating said horn to deliver ultrasonic energy to said overlapped first and second plastic fabric layers when the force with which said horn clamps said overlapped first and second plastic fabric layers against said anvil reaches a preselected level;

increasing said force above said preselected level of force while delivering ultrasonic energy to said overlapped first and second plastic fabric layers to soften said yarns from which said first and second plastic fabric layers are woven without melting said yarns and to compress said softened yarns together;

deactivating said horn to stop its delivery of ultrasonic energy when said horn has reached a preselected distance from said anvil;

maintaining said force for a preselected hold time, to allow said synthetic polymeric resin of said yarns to cool and to harden under compression; and removing said horn from said overlapped first and second plastic fabric layers.

2. The method as claimed in claim 1 wherein said first and second plastic fabric layers are lengthwise ends of a flat-woven fabric, such that the bonding of said first plastic fabric layer to said second plastic fabric layer provides a seam for forming said flat-woven fabric into an endless loop.

3. The method as claimed in claim 2 wherein prior to disposing said first plastic fabric layer on said anvil at least one widthwise yarn is removed therefrom.

4. The method as claimed in claim 2 wherein prior to disposing said second plastic fabric layer over said first plastic fabric layer on said anvil at least one widthwise yarn is removed therefrom.

5. The method as claimed in claim 1 wherein said first and second plastic fabric layers are a flat-woven fabric and a folded-back portion thereof, said folded-back portion being bonded to said flat-woven fabric to secure a seaming spiral within a crease defined by said folded-back portion.

6. The method as claimed in claim 1 wherein said first and second plastic fabric layers are a fabric and a fabric flap, said fabric flap being bonded to said fabric along one edge thereof.

7. The method as claimed in claim 6 wherein said fabric flap covers a seam on the underside of said fabric.

8. The method as claimed in claim 1 wherein said first and second plastic fabric layers are a fabric and a piece of fabric, said fabric having a damaged area and said piece of fabric being of a size larger than said damaged area, said piece of fabric being bonded to said fabric over said damaged area to repair said fabric.

9. The method as claimed in claim 1 wherein said anvil has a longitudinal direction and a transverse direction, and wherein a plurality of transverse ribs is provided on a surface thereof.

10. The method as claimed in claim 1 wherein said anvil has a knurled surface.

11. The method as claimed in claim 1 further comprising, after the step of removing said horn from said overlapped first and second plastic fabric layers, the steps of translating said horn relative to said overlapped first and second plastic fabric layers a distance equivalent to the length of said horn, and of repeating all steps as many times as are required to bond said overlapped first and second plastic fabric layers completely to one another across the widths thereof.

12. The method as claimed in claim 2 wherein said flat-woven fabric is a belt for a double nip thickener.

13. The method as claimed in claim 2 wherein said flat-woven fabric is a belt for a paper deinking and recycling machine.

14. The method as claimed in claim 2 wherein said flat-woven fabric is a belt for a twin wire press for pulp processing.

15. The method as claimed in claim 2 wherein said flat-woven fabric is a belt for a twin wire press for sludge processing.

16. The method as claimed in claim 2 wherein said flat-woven fabric is a belt for a twin wire press for processing material requiring an increase in solids content.

17. The method as claimed in claim 5 wherein said flat-woven fabric is a shrinkable spiral seamed belt for a vacuum drum.

18. The method as claimed in claim 6 wherein said fabric is a shrinkable spiral seamed belt for a vacuum drum.

* * * * *